US012587600B2

(12) United States Patent
Auffret et al.

(10) Patent No.: US 12,587,600 B2
(45) Date of Patent: Mar. 24, 2026

(54) METHOD FOR MANAGING THE ROUTING OF A CALL INTENDED FOR A FIRST COMMUNICATION TERMINAL, METHOD FOR ROUTING SAID CALL AND CORRESPONDING DEVICES

(71) Applicant: ORANGE, Issy-les-Moulineaux (FR)

(72) Inventors: Jean-Marc Auffret, Châtillon Cedex (FR); Philippe Lemordant, Châtillon Cedex (FR); Xavier De Snoeck, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/613,281

(22) PCT Filed: May 18, 2020

(86) PCT No.: PCT/EP2020/063846
§ 371 (c)(1),
(2) Date: Nov. 22, 2021

(87) PCT Pub. No.: WO2020/234246
PCT Pub. Date: Nov. 26, 2020

(65) Prior Publication Data
US 2022/0224794 A1 Jul. 14, 2022

(30) Foreign Application Priority Data

May 23, 2019 (FR) ...................................... 1905454

(51) Int. Cl.
*H04M 3/42* (2006.01)
*H04M 3/54* (2006.01)

(52) U.S. Cl.
CPC ......... *H04M 3/42263* (2013.01); *H04M 3/54* (2013.01)

(58) Field of Classification Search
None
See application file for complete search history.

(56) References Cited

U.S. PATENT DOCUMENTS

2003/0073431 A1* 4/2003 Dorenbosch .......... H04M 1/006
455/445
2005/0164686 A1* 7/2005 Bushnell ........... H04M 3/42229
455/445
(Continued)

FOREIGN PATENT DOCUMENTS

EP 2192756 A1 6/2010
EP 3399732 A1 11/2018
WO 2018148028 A1 8/2018

OTHER PUBLICATIONS

International Search Report dated Jul. 8, 2020 for corresponding International Application No. PCT/EP2020/063846, May 18, 2020.
(Continued)

*Primary Examiner* — Antim G Shah
(74) *Attorney, Agent, or Firm* — David D. Brush; Westman, Champlin & Koehler, P.A.

(57) ABSTRACT

A method and apparatus for call forwarding. Some communication services make it possible to transfer a telephone call intended for a communication terminal to another communication terminal. Such services are referred to as call forwarding services. The user seeking to avail of call forwarding must manually configure the forwarding of calls intended for their landline to the communication terminal of their choice. The configuration operations are performed directly on the landline and are tedious. There is thus a significant risk of input error. Furthermore, when the user seeks to end call forwarding, they must once again manually configure their landline. According to the method, call forwarding is activated according to fulfilment of activation conditions. Contextual information collection by the user's
(Continued)

Figure 1:
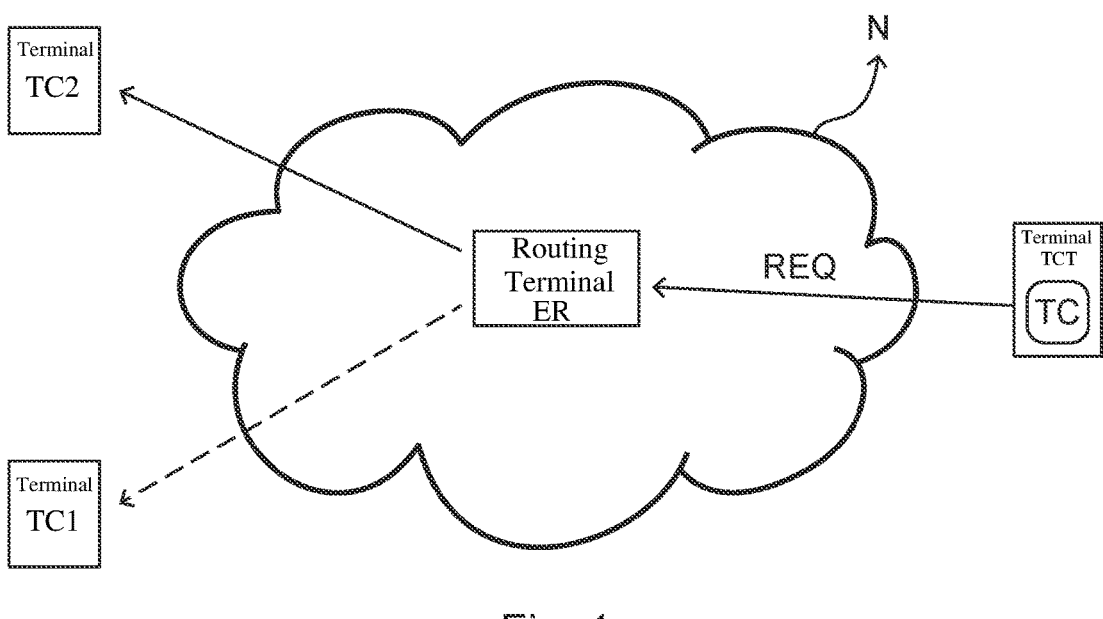

communication terminal is used to determine fulfilment of the activation conditions. Thus, such a solution offers flexibility, adaptability and ease of use for the user.

20 Claims, 3 Drawing Sheets

(56) References Cited

U.S. PATENT DOCUMENTS

| | | | |
|---|---|---|---|
| 2011/0237263 A1* | 9/2011 | Couse .............. | H04M 15/8055 |
| | | | 455/445 |
| 2014/0113567 A1* | 4/2014 | Kennedy ........... | H04M 1/72457 |
| | | | 455/557 |
| 2016/0358394 A1* | 12/2016 | Konicek .......... | H04M 1/72513 |
| 2018/0234549 A1* | 8/2018 | Coffman ................. | H04M 3/58 |
| 2018/0332084 A1* | 11/2018 | Choe ................. | H04M 3/42263 |
| 2019/0371331 A1* | 12/2019 | Schramm ................ | G10L 15/22 |

OTHER PUBLICATIONS

Written Opinion of the International Searching Authority dated Jul. 8, 2020 for corresponding International Application No. PCT/EP2020/063846, filed May 18, 2020.
English translation of the Written Opinion of the International Searching Authority dated Jul. 20, 2020 for corresponding International Application No. PCT/EP2020/063846, filed May 18, 2020.
European Notification Under Article 94(3) EPC dated Jul. 12, 2024, for corresponding European Application No. 20 1 725 205.7.

* cited by examiner

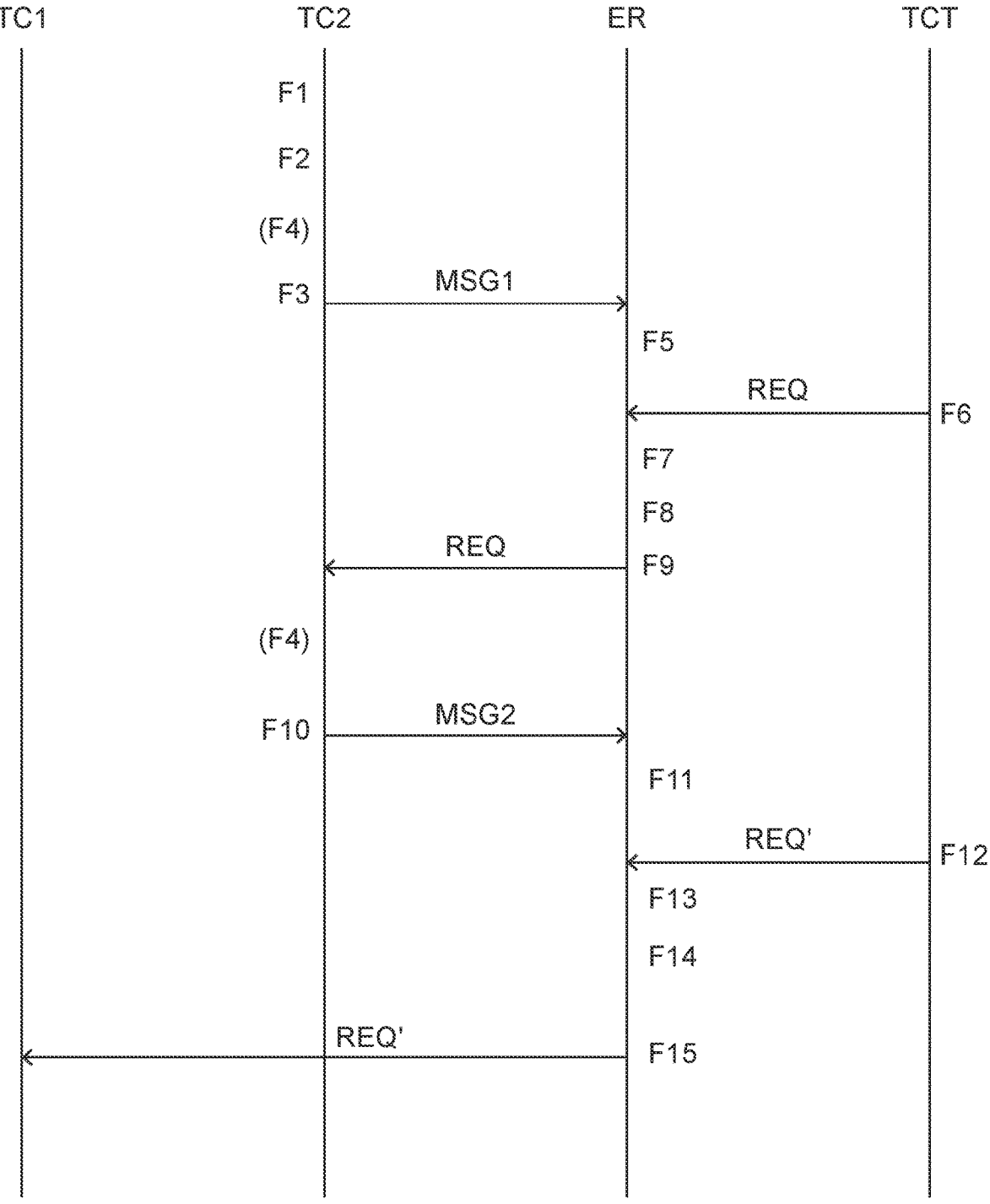
_Fig. 3_

TC2

METHOD FOR MANAGING THE ROUTING OF A CALL INTENDED FOR A FIRST COMMUNICATION TERMINAL, METHOD FOR ROUTING SAID CALL AND CORRESPONDING DEVICES

CROSS-REFERENCE TO RELATED APPLICATIONS

This Application is a Section 371 National Stage Application of International Application No. PCT/EP2020/063846, filed May 18, 2020, which is incorporated by reference in its entirety and published as WO 2020/234246 A1 on Nov. 26, 2020, not in English.

FIELD OF THE INVENTION

The field of the invention is that of call routing management between two communication terminals. More specifically, the invention relates to communication services enabling a user to configure a transfer of calls intended for a first communication terminal to a second communication terminal.

PRIOR ART AND ITS DRAWBACKS

Some communication services currently make it possible to configure a transfer of a telephone call intended for a communication terminal such as a landline to another communication terminal of landline or mobile terminal type. Such services are commonly referred to as call forwarding services.

Such a call forwarding service functions as follows. The user seeking to avail of the service must manually configure the forwarding of calls intended for their landline to the communication terminal of their choice. The configuration operations are performed directly on the landline. These configuration operations are tedious as they require the input of sometimes long and complex codes. There is thus a significant risk of input error.

Furthermore, when the user seeks to end call forwarding, they must once again manually configure their landline.

There is therefore a need for a call forwarding management technique not involving these drawbacks of the prior art. In particular, there is a need for a technique offering flexibility in the configuration and use of a call forwarding service. There is also a need for a technique that enhances the experience for the terminal user when configuring a call forwarding service.

DESCRIPTION OF THE INVENTION

The invention meets this need by proposing a method for managing the routing of calls intended for a first communication terminal, the management method being implemented by a second communication terminal and comprising:

obtaining at least one piece of contextual information relating to said second terminal, transmitting, to at least one call routing device, a modification command of the routing of calls intended for said first terminal according to at least one activation condition verified by said at least one piece of contextual information.

In the proposed solution, the configuration operations are performed at the level of the second communication terminal, such as for example a mobile communication terminal.

It is therefore not necessary that the user be physically close to the first communication terminal for which they seek to forward calls. The user can then, for example, manage call forwarding from their landline where and when they wish.

In the proposed solution, the call forwarding service is activated based on the verification of activation conditions. The information used to determine the fulfilment of the activation conditions is contextual information collected by the user's second communication terminal and which does not require particular user interaction with the first communication terminal or the second communication terminal, such as the input of a forwarding code. This can consist of information collected by the second communication terminal.

Thus, such a solution offers flexibility, adaptability and ease of use for the user.

A call routing modification corresponds equally well to call forwarding activation, call forwarding deactivation or cancellation, call forwarding recipient modification.

In the case of an activation of routing of calls intended for the first terminal, the routing modification command indicates the terminal to which the call is to be routed. This terminal can correspond to the second terminal implementing the method or indeed any other terminal.

In the case of a modification of the recipient of the routing of calls intended for the first terminal, the routing modification command indicates the new terminal to which the call is to be routed.

Thus according to a specific feature of the management method, when the command is a call routing activation command, a call identifier of a communication terminal to which the call intended for the first terminal is routed is determined by means of the piece of contextual information; the same applies when the command is a call routing modification command.

According to a further specific feature of the management method, the method comprises, when said at least one activation condition is no longer verified, transmitting, to the routing device, another modification command of the routing of calls intended for the first terminal.

Thus, call forwarding is deactivated or cancelled when the call forwarding service activation conditions are no longer fulfilled.

In a specific embodiment of the management method, the method comprises a learning phase of said at least one activation condition according to said at least one piece of contextual information.

In this embodiment of the management method, the communication terminal implementing the management method has a learning module. Such a learning module learns as the call forwarding service is used by the user the conditions whereby the service is activated or deactivated. Ultimately, this learning makes it possible to further reduce the user's interactions with the communication terminal the purpose of which is to configure the call forwarding service.

In a specific embodiment of the management method, the method comprises a validation of the routing modification prior to the transmission of said modification command of routing intended for the at least one call routing device.

In this specific embodiment, any decision taken by the communication terminal as to the activation, deactivation or modification of the call forwarding service is subject to the user's validation. This is particularly useful when the communication terminal is in the learning phase, as it learns modification conditions which are approved, and therefore desired, by the user of the communication terminal.

In a specific embodiment of the management method, said at least one piece of contextual information belongs to the group comprising:

a current time and date, a geographic position of the second communication terminal, at least one identifier of a local communication network detected by the second communication terminal, at least one piece of availability information in respect of the user of the second communication terminal, a charge level of a battery of the second communication terminal.

The invention also relates to a method for routing calls intended for a first communication terminal, the routing method being implemented by a call routing device and comprising:

receiving a call to be routed intended for the first terminal, routing said call to a second communication terminal or a third terminal, based on a piece of call routing information, the piece of call routing information intended for the first terminal having been received previously by the routing device from the second terminal.

The invention further relates to a communication terminal capable of managing the routing of a call intended for a first communication terminal, said communication terminal comprising at least one processor configured for:

obtaining at least one piece of contextual information relating to said communication terminal, transmitting, to at least one piece of call routing equipment, a modification command of the routing of said call intended for said first communication terminal according to at least one activation condition verified by said at least one piece of contextual information.

Such a communication terminal can be a landline or a mobile communication terminal.

The invention further relates to a piece of equipment for routing a call intended for a first communication terminal, the routing equipment comprising at least one processor configured for:

intercepting said call associated with a call identifier of the first communication terminal, retrieving, according to the call identifier of the first communication terminal associated with said call, a piece of routing information of said call, the routing information of said call having been previously transmitted to said call routing equipment by a second communication terminal, routing said call according to the routing information.

Such a piece of routing equipment can be, for example a residential gateway, a business gateway, or a piece of routing equipment located in a remote communication network.

The invention finally relates to computer program products comprising program code instructions for the implementation of the methods as described above, when they are executed by a processor.

The invention also relates to a computer-readable storage medium whereon computer programs comprising program code instructions for executing the steps of the methods according to the invention as described above are recorded.

Such a storage medium can be any entity or device capable of storing the programs. For example, the medium can include a storage means, such as a ROM, for example CD ROM or a microelectronic circuit ROM, or a magnetic storage means, for example a USB key or a hard drive. Moreover, such a storage medium can be a transmissible medium such as an electrical or optical signal, which can be routed via an electrical or optical cable, by radio or by other means, such that the computer programs contained therein are remotely executable. The programs according to the invention can be in particular downloaded on a network for example the Internet.

Alternatively, the storage medium can be an integrated circuit wherein the programs are incorporated, the circuit being adapted to execute or to be used in the execution of the methods according to the invention cited above.

LIST OF FIGURES

Figure 2:
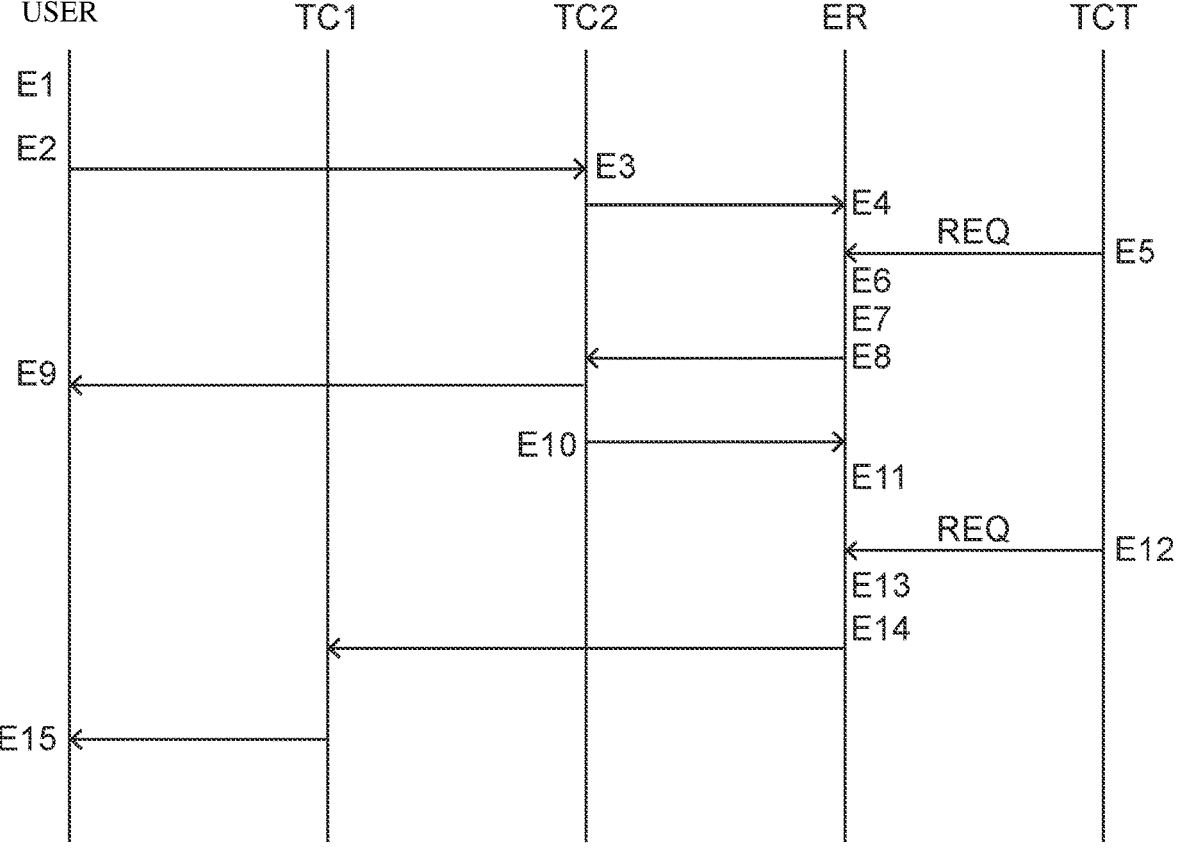
Figure 4:
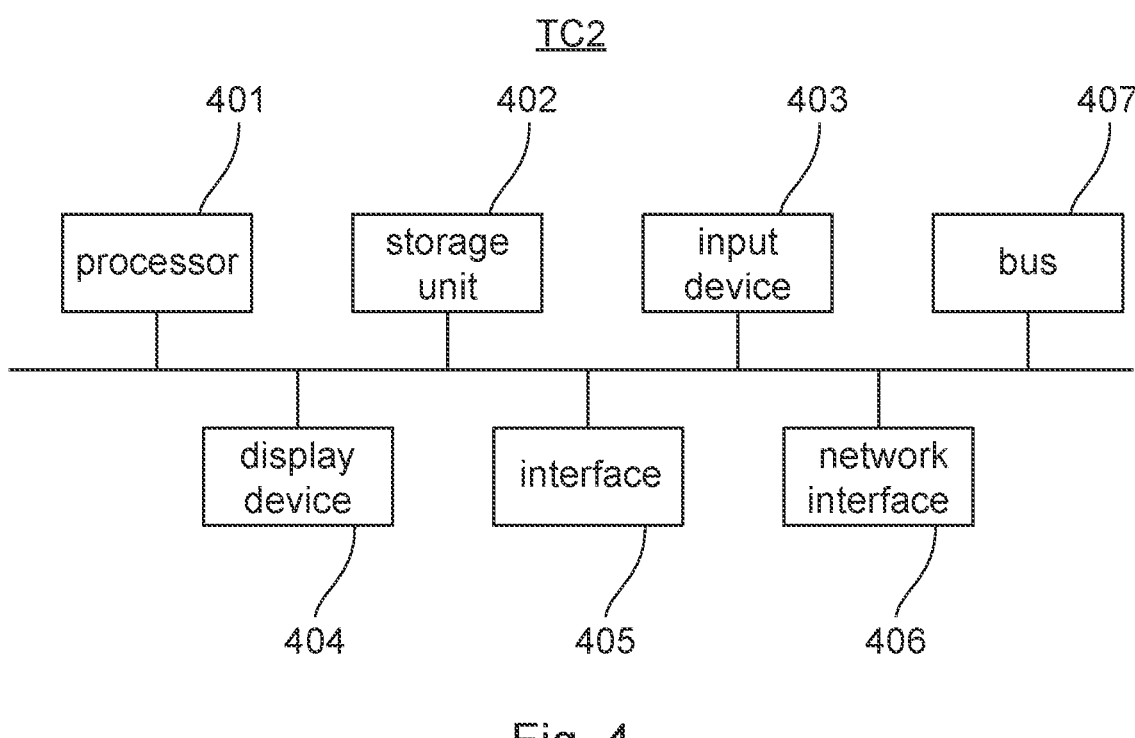
Figure 5:
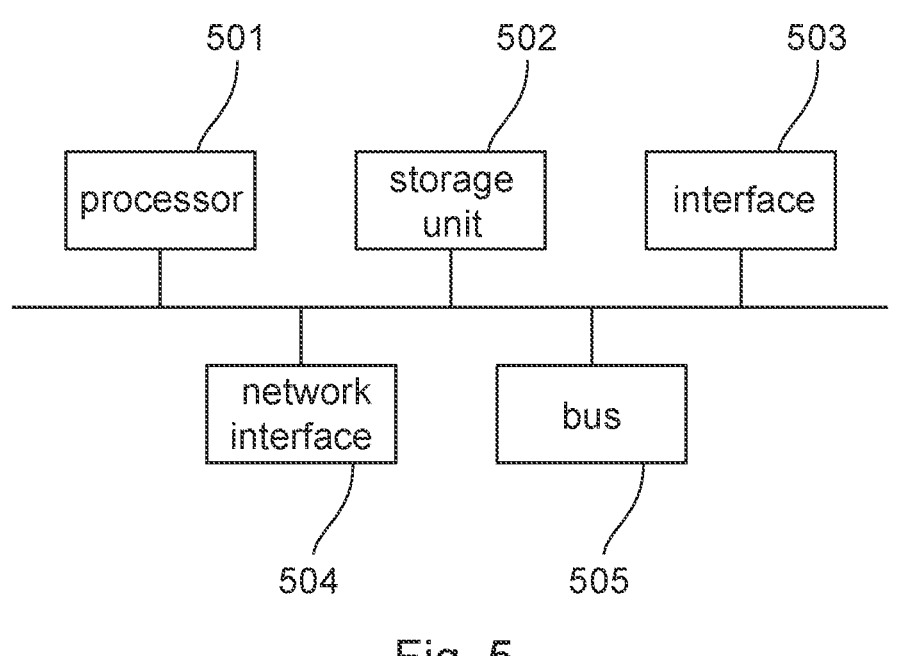

Further aims, features and advantages of the invention will emerge more clearly on reading the following description, given by way of illustrative and non-limiting example, with reference to the figures, wherein:

FIG. 1 represents an example of architecture wherein the present invention is implemented, FIG. 2 represents the different steps of a call routing management method from a user's perspective, FIG. 3 represents the different steps of a call routing management method when it is implemented by a communication terminal and a piece of call routing equipment, FIG. 4 represents the communication terminal according to an embodiment of the invention, FIG. 5 represents the call routing equipment according to an embodiment of the invention.

DETAILED DESCRIPTION OF EMBODIMENTS OF THE INVENTION

FIG. 1 represents an example of architecture wherein the present invention is for example implemented by two communication terminals TC1 and TC2. No limitation is associated with the number of communication terminals implementing the solution described hereinafter.

In an implementation example, the communication terminal TC1 is for example a landline which can be located at a user's workplace, and the communication terminal TC2 is a mobile terminal of the user. In a further embodiment, the communication terminal TC2 can be a residential gateway, also known as a "box".

When a third party seeks to contact the user on their landline, a terminal TCT of the third party sends a request to make a call REQ intended for the user's terminal TC1.

This request to make a call REQ is intercepted by a call routing device ER located in a communication network N. The call routing device ER is for example a residential gateway, a business gateway or any communication equipment located in the communication network N capable of managing telephone call routing.

The routing device ER comprises a correspondence table TC wherein the information required for routing calls is stored. In this illustrative example, the correspondence table TC comprises a call forwarding rule associated with the communication terminal TC1: call forwarding is activated for this terminal TC1 to the terminal TC2. The routing device ER determines based on this call forwarding rule that the request to make a call REQ should not be routed to the communication terminal TC1 but to the communication terminal TC2. This is represented in FIG. 1 by the dotted line joining the call routing device ER to the communication terminal TC1.

The call routing device ER then sends the request to make a call REQ to the terminal TC2.

FIG. 2 represents the different steps of a call routing management method from a user's perspective.

In a step E1, a user seeks to implement a call forwarding service for a communication terminal TC1, such as their landline.

During a step E2, in a first specific embodiment, the user activates the execution of a software application installed in the communication terminal TC2, such as the user's mobile terminal. To do this, the user can for example select an icon displayed on a screen of the communication terminal TC2. This selection of a defined zone of the screen of the communication terminal TC2 is interpreted by the latter as a request to execute the software application. This software application can be a telephone call routing management application.

In a second specific embodiment, the software application is executed as a background task by the communication terminal TC2. In such an embodiment, the user does not need to select an icon displayed on a screen of the communication terminal TC2 to activate the execution of the software application. In this embodiment, when the user leaves the location where the communication terminal TC1 is located, the communication terminal TC2 determines that their geographic position has changed, and notifies the application which then executes a redirection order. This geographic position corresponds to an example of contextual information. The location where the communication TC1 is located can correspond to a geographic zone, such as for example the location where the user's business or home is located. The location where the communication terminal TC1 is located can also correspond to a radio coverage zone such as for example the coverage zone of a Wi-Fi network controlled by an embedded access point in a residential gateway or in a business gateway.

Prior to the execution of the application, the latter is configured by the user who provides inter alia a call identifier ID1 of the communication terminal TC1. A call identifier ID2 of the communication terminal TC2 is also provided to the application. Call identifiers associated with other terminals can also be configured by the user.

In a step E3, the communication terminal TC2 sends the call routing device ER a modification command of the routing of calls intended for the terminal TC1 to the terminal TC2 or a third terminal TC3, not shown in FIG. 1. This command is sent to the routing device by means of an API ("Application Programming Interface") for example of http (for example REST), short message or USSD ("Unstructured Supplementary Service Data") code type or by means of a proprietary interface (also known as "socket"). When the call routing intended for the terminal TC1 is modified to be routed to the terminal TC2, this modification command comprises for example the call identifiers ID1 and ID2 of the communication terminals TC1 and TC2 as well as a piece of information modifying the routing of calls intended for the communication terminal TC1 to the communication terminal TC2. In the case of the terminal TC3, this modification command comprises for example the call identifiers ID1, ID2 and ID3 of the communication terminals TC1, TC2 and TC3 as well as a piece of information modifying the routing of calls intended for the communication terminal TC1 to the communication terminal TC3.

Such a modification command of the routing of calls intended for the terminal TC1 can be a call routing activation command, a call routing deactivation or cancellation command or a call routing modification command which consists, for example of routing calls intended for the communication terminal TC1 no longer to the communication terminal TC2 but to the third communication terminal TC3.

In the case of a call routing deactivation or cancellation command, this modification command comprises for example the call identifier ID1 of the communication terminal TC1 as well a piece of cancellation information of routing of calls intended for the communication terminal TC1.

In the step E3, the call routing modification command is considered here to be an activation command.

In a step E4, the call routing device ER updates the correspondence table TC wherein the information required for routing calls is stored.

In a step E5, a third-party communication terminal TCT initiates a call to the communication terminal TC1 by sending a request to make a call REQ.

In a step E6, this request to make a call REQ is intercepted by a call routing device ER.

In a step E7, the call routing device ER determines that the call associated with the request to make a call REQ should be routed to the communication terminal TC2.

In a step E8, the call routing device ER sends the request to make a call REQ to the communication terminal TC2.

In a step E9, the user accepts the call with the third party on the communication terminal TC2.

When the user has returned to the location where the communication terminal TC1 is located, the communication terminal TC2 determines that their geographic position has changed and corresponds to that where the terminal TC1 is located and notifies the software application.

In a step E10, the communication terminal TC2 sends the call routing device ER a modification command, here for deactivation or cancellation, of call routing to the terminal TC1. This command comprises the call identifier ID1 of the communication terminal TC1 as well as a piece of cancellation information of the routing of calls intended for the communication terminal TC1, i.e., the routing of these calls to the communication terminal TC2.

When the modification command sent by the communication terminal TC2 is a call routing modification command from the terminal TC2 to the terminal TC3, this modification command comprises the call identifier ID1 of the communication terminal TC1, a piece of modification information of the routing of calls intended for the communication terminal TC1 and the call identifier ID3 of the communication terminal TC3 to which the call should now be routed.

In a step E11, the call routing device ER updates the correspondence table TC wherein the information required for routing calls is stored.

In a step E12, a third-party communication terminal TCT initiates a call to the communication terminal TC1 by sending a request to make a call REQ.

This request to make a call REQ is intercepted by a call routing device ER.

In a step E13, the call routing device ER determines that no routing rule is stored in the correspondence table TC1 and that, accordingly, the call associated with the request to make a call REQ should be routed to the communication terminal TC1.

In a step E14, the call routing device ER sends the request to make a call REQ to the communication terminal TC1.

In a step E15, the user accepts the call with the third party on the communication terminal TC1.

FIG. 3 represents the different steps of a call routing management method when it is implemented by a communication terminal TC2 and the call routing device ER.

In a step F1, the communication terminal TC2 obtains information enabling the implementation of a call forwarding service. Some information obtained is entered by the user of the communication terminal TC2 by means of a user interface, such as for example a touch screen. This information entered by the user is for example, the call identifier ID1 of the communication terminal TC1 as well as the call identifiers of other communication terminals (not shown in the figures) such as the identifier ID3 of the communication terminal TC3. Further contextual information is collected by the communication terminal TC2. This contextual information is for example:

a current time and date, a geographic position of the communication terminal TC2 provided, for example, by a geolocation module in the communication terminal TC2, a geographic position of another communication terminal for which the call identifier has been entered by the user, at least one identifier of a local communication network detected by the communication terminal TC2 or by another communication terminal for which the call identifier has been entered by the user such that the identifier ID3 of the communication terminal TC3, such as for example a SSID (Service Set identifier) identifier of a Wi-Fi communication network, at least one piece of availability information in respect of the user of the communication terminal as stored in a calendar of the communication terminal TC2 or another communication terminal for which the call identifier has been entered by the user, a charge level of a battery of the communication terminal TC2, a Bluetooth device detection, etc.

This contextual information can correspond to internal events in the communication terminal TC2 or indeed external events to the communication terminal TC2.

The step F1 is implemented periodically in order to update the contextual information obtained.

In a step F2, the communication terminal TC2 determines that at least one activation condition of the routing of a call intended for the communication terminal TC1 is verified. The communication terminal TC2 also determines the communication terminal for which a call identifier was entered during the step F1 to which the call should be routed according to at least one activation condition.

In a first embodiment, the activation condition is the detection by the communication terminal TC2 of the selection, via the user interface, of a defined area of the screen of the communication terminal TC2 displaying for example a call forwarding service activation icon.

In a second embodiment, the communication terminal TC2 comprises a module for learning the fulfilment of at least one modification condition of the call forwarding service, according to the contextual information obtained during the step F1. Such a learning module learns as the call forwarding service is used by the user the conditions whereby the service is activated or deactivated or modified.

In this second embodiment, an activation condition is, for example, the detection by the communication terminal TC2 of a change of geographic position. Thus, if the communication terminal TC2 leaves a specific geographic zone wherein the communication terminal TC1 is located, for example a circle having a radius of 200 meters centred on the position of the communication terminal TC1, then an activation condition is fulfilled.

In a further embodiment example, if the geographic position obtained during the step F1 indicates that the communication terminal TC2 is located in a foreign country, the activation condition "communication terminal TC2 is leaving a certain geographic zone wherein the communication terminal TC1 is located" is fulfilled, for all that the call forwarding service is not activated as it is coupled with another activation condition indicating that when the communication terminal TC2 is located abroad the call forwarding service should not be activated.

In a further example, when the communication terminal TC2 detects that it is no longer covered by a Wi-Fi communication network for which the SSID is "home" and that the terminal TC1 is the home landline, then an activation condition is fulfilled.

In a final example, when the communication terminal TC2 detects via the calendar that the user has a dental appointment on the date D at the time T and the current time and date of the communication terminal TC2 are the time T on the date D, an activation condition is fulfilled.

In a first implementation, the communication terminal to which the call should be routed is selected by means of the user interface of the communication terminal TC2.

In a second implementation, the communication terminal TC2 determines according to the contextual information collected during the step F1 the call identifier of the communication terminal to which the call should be routed.

Thus, for example, the communication terminal TC2 collects a piece of information relating to a geographic position of the third communication terminal TC3. Such a piece of information is for example the connection of the third communication terminal TC3 to a Wi-Fi communication network for which the SSID is "home". When such a piece of information is an activation condition then the communication terminal TC2 identifies the third communication terminal TC3 as being a communication terminal to which the communication can be routed.

When the activation conditions are fulfilled, the communication terminal TC2 sends a command MGS1 to the call routing device ER during a step F3.

The command MSG1 comprises a piece of modification information of the routing of initiated calls intended for the communication terminal TC1. This command comprises the call identifier ID1 of the communication terminal TC1. When the modification is a routing activation or a modification of the recipient communication of the routing, the command comprises a call identifier of the communication terminal to which the call should be routed, for example the identifier ID2 of the terminal TC2.

Optionally, the communication terminal TC2 implements a routing modification validation step F4 by the user prior to sending the command MSG1. Thus, any decision taken by the communication terminal TC2 as to the activation or deactivation or modification of the call forwarding service is subject to the user's validation. This is particularly useful when the communication terminal TC2 is in the learning phase, as it learns modification conditions which are approved, and therefore desired, by the user of the communication terminal.

In a step F5, on receiving the command MSG1, the call routing device ER updates the correspondence table TC wherein the information comprised in the command MSG1 is stored.

During a step F6, the communication terminal TCT initiates a call to the communication terminal TC1 by sending a request to make a call REQ. The request to make a call REQ comprises the call identifier ID1 of the terminal TC1.

In a step F7, the call routing device ER intercepts the request to make a call REQ.

During a step F8, the call routing device ER retrieves, according to the call identifier ID1 of the communication terminal TC1 associated with a request to make a call REQ, the piece of modification information of the routing of said call to the communication terminal TC2 and the identifier of the communication terminal TC2 previously stored in the correspondence table TC.

In a step F9, the call routing device ER routes the request to make a call REQ to the communication terminal TC2.

When, for the communication terminal TC1, the call routing device ER retrieves in the correspondence table TC the call identifiers ID of several communication terminals, the call routing device ER determines the communication terminal TC to which the call is routed either according to explicit information comprised in the message MGS1, for example in the form of the call identifier ID of a given communication terminal; or according to information according to a priority associated with the call identifier ID of each of the communication terminals TC associated with the communication terminal TC1.

When the activation conditions are no longer fulfilled, the communication terminal TC2 sends a command MGS2 to the call routing device ER during a step F10.

The command MSG2 comprises a piece of modification information, here deactivation, of the routing of initiated calls intended for the communication terminal TC1 to the communication terminal TC2, the call identifier ID1 of the communication terminal TC1.

Optionally, the communication terminal TC2 implements a routing service modification validation step F4 prior to sending the message MSG2.

In a step F11, on receiving the command MSG2, the call routing device ER updates a correspondence table TC to deactivate the routing rule.

During a step F12, the communication terminal TCT initiates a call to the communication terminal TC1 by sending a request to make a call REQ'. The request to make a call REQ' comprises the call identifier ID1 of the mobile terminal TC1.

In a step F13, the call routing device ER intercepts the request to make a call REQ'.

During a step F14, the call routing device ER checks, according to the call identifier ID1 of the communication terminal TC1 associated with a request to make a call REQ', that no routing rule is stored in the correspondence table TC for the terminal TC1.

In a step F15, the call routing device ER routes the request to make a call REQ' to the communication terminal TC1.

FIG. 4 represents the communication terminal TC2 according to an embodiment. Such a communication terminal TC2 is capable of implementing the different embodiments of the method described with reference to FIG. 3.

A communication terminal TC2 can comprise at least one hardware processor 401, a storage unit 402, an input device 403, a display device 404, an interface 405, and at least one network interface 406 which are connected to each other via a bus 407. Obviously, the constituent elements of the communication terminal TC2 can be connected by means of a connection other than a bus.

The processor 401 controls the operations of the communication terminal TC2. The storage unit 402 stores at least one program for implementing the method according to an embodiment to be executed by the processor 401, and various data, such as parameters used for calculations made by the processor 401, intermediate data from calculations made by the processor 401, etc.

The processor 401 can be formed by any known and suitable hardware or software, or by a combination of hardware and software. For example, the processor 401 can be formed by dedicated hardware such as a processing circuit, or by a programmable processing unit such as a central processing unit which executes a program stored in a memory thereof.

The storage unit 402 can be formed by any suitable means capable of storing the program or programs and data in a computer-readable manner. Examples of storage unit 402 comprise computer-readable non-transitory storage media such as semiconductor memory devices, and magnetic, optical or magneto-optical recording media loaded in a read/write unit.

The input device 403 can be formed by a keyboard, a pointing device such as a mouse to be used by a user to enter commands. The display device 404 can also be formed by a display module, such as for example a graphical user interface (GUI).

The interface 405 provides an interface between the communication terminal TC2 and another piece of equipment not shown in the figure.

At least one network interface 406 provides a connection between the communication terminal TC2 and the call routing device ER.

FIG. 5 represents the call routing device ER according to an embodiment. Such a call routing device is capable of implementing the different embodiments of the method described with reference to FIG. 3.

A call routing device ER can comprise at least one hardware processor 501, a storage unit 402, an interface 503, and at least one network interface 504 which are connected to each other via a bus 505. Obviously, the constituent elements of the call routing device ER can be connected by means of a connection other than a bus.

The processor 501 controls the operations of the call routing device ER. The storage unit 502 stores at least one program for implementing the method according to an embodiment to be executed by the processor 501, and various data, such as parameters used for calculations made by the processor 501, intermediate data from calculations made by the processor 501, etc. The processor 501 can be formed by any known and suitable hardware or software, or by a combination of hardware and software. For example, the processor 501 can be formed by dedicated hardware such as a processing circuit, or by a programmable processing unit such as a central processing unit which executes a program stored in a memory thereof.

The storage unit 502 can be formed by any suitable means capable of storing the program or programs and data in a computer-readable manner. Examples of storage unit 502 comprise computer-readable non-transitory storage media such as semiconductor memory devices, and magnetic, optical or magneto-optical recording media loaded in a read/write unit.

The interface 503 provides an interface between the call routing device ER and another piece of equipment not shown in the figure.

At least one network interface 504 provides a connection between the call routing device ER and the communication terminal TC2.

The invention claimed is:

1. A management method comprising:
   managing routing of calls intended to be routed to a first communication terminal by a gateway, the managing being implemented by a second communication terminal without intervention of the first communication terminal, the second communication terminal being able to receive calls, and the managing comprising:

obtaining, by the second communication terminal, at least one piece of contextual information relating to said second communication terminal;

determining, by the second communication terminal that at least one activation condition is verified by the at least one piece of contextual information, wherein said at least one activation condition is selected from the group consisting of the second communication terminal leaving a geographic zone in which the first terminal is located, the second communication terminal being located a distance from the first communication terminal that exceeds a threshold, and the second communication terminal being located outside a coverage area of a local wireless communication network to which the first communication terminal belongs; and in response to the at least one activation condition being verified by said at least one piece of contextual information, transmitting, by the second communication terminal to the gateway, a modification command of the routing of calls intended for said first communication terminal, said modification command triggering a redirection, by the gateway, of said calls intended for said first communication terminal to said second communication terminal or to a third communication terminal.

2. The management method according to claim 1 further comprising, in response to the command being a call routing activation command, determining, by using the piece of contextual information, a call identifier of the second communication terminal or the third communication terminal to which the call intended for the first communication terminal is routed.

3. The management method according to claim 1 further comprising, in response to the command being a call routing recipient modification command, determining, by using the piece of contextual information, a call identifier of the second communication terminal or the third communication terminal to which the call intended for the first communication terminal is routed.

4. The management method according to claim 1 further comprising, in response to said at least one activation condition being no longer verified, transmitting, to the routing device, another modification command of the routing of calls intended for the first communication terminal.

5. The management method according to claim 1 comprising a learning phase of said at least one activation condition according to said at least one piece of contextual information.

6. The management method according to claim 1 comprising a validation of routing activation prior to the transmission of said modification command of routing intended for the at least one call routing device.

7. The management method according to claim 1 wherein said at least one piece of contextual information is selected from the group consisting of:

a current time and date, a geographic position of the second communication terminal, at least one identifier of a local communication network detected by the second communication terminal, at least one piece of availability information in respect of a user of the second communication terminal, and a charge level of a battery of the second communication terminal.

8. The management method according to claim 1, wherein obtaining the at least one piece of contextual information is automatically performed by the second communication terminal without intervention of a user of the second communication terminal.

9. The management method according to claim 1, wherein the at least one activation condition includes the distance between the second communication terminal and the first communication terminal exceeding the threshold.

10. The management method according to claim 1, wherein the at least one activation condition includes the second communication terminal being outside coverage of the local wireless communication network to which the first communication terminal belongs.

11. A method for routing calls intended for a first communication terminal, the method being implemented by a gateway, and comprising:

receiving, from a second communication terminal, a modification command of the routing of calls intended for said first communication terminal, without intervention of the first communication terminal, the second communication terminal being able to receive calls, and the modification command being based on at least one activation condition being verified by at least one piece of contextual information of the second communication terminal, wherein said at least one activation condition is selected from the group consisting of the second communication terminal leaving a geographic zone in which the first terminal is located, the second communication terminal being located a distance from the first communication terminal that exceeds a threshold, and the second communication terminal being located outside a coverage area of a local wireless communication network to which the first communication terminal belongs;

receiving a call to be routed intended for the first communication terminal; and routing said call to the second communication terminal or a third terminal, based on a piece of call routing information contained in the modification command.

12. The method according to claim 11, wherein the at least one activation condition includes the distance between the second communication terminal and the first communication terminal exceeding the threshold.

13. The method according to claim 11, wherein the at least one activation condition includes the second communication terminal being outside coverage of the local wireless communication network to which the first communication terminal belongs.

14. A second communication terminal, said second communication terminal comprising:

at least one processor configured to manage routing of a call intended for a first communication terminal, without intervention of said first communication terminal, by:

obtaining at least one piece of contextual information relating to said second communication terminal;

determining, by the second communication terminal that at least one activation condition is verified by the at least one piece of contextual information, wherein said at least one activation condition is selected from the group consisting of the second communication terminal leaving a geographic zone in which the first terminal is located, the second communication terminal being located a distance from the first communication terminal that exceeds a threshold, and the second communication terminal being located outside a coverage area of a local wireless communication network to which the first communication terminal belongs; and in response to the at least one activation condition being verified by said at least one piece of contextual information, transmitting, the gateway, a modification command of the routing of said call intended for said first communication terminal said modification command triggering a redirection, by the gateway, of said calls intended for said first communication terminal to said second communication terminal or to a third communication terminal.

15. The second communication terminal according to claim 14, wherein the at least one activation condition includes the distance between the second communication terminal and the first communication terminal exceeding the threshold.

16. The second communication terminal according to claim 14, wherein the at least one activation condition includes the second communication terminal being outside coverage of the local wireless communication network to which the first communication terminal belongs.

17. Gateway for routing a call intended for a first communication terminal, the gateway comprising:

at least one processor configured to:

receive, from a second communication terminal, a modification command of the routing of calls intended for said first communication terminal, without intervention of the first communication terminal, the second communication terminal being able to receive calls, and the modification command being based on at least one activation condition being verified by at least one piece of contextual information of the second communication terminal, wherein said at least one activation condition is selected from the group consisting of the second communication terminal leaving a geographic zone in which the first terminal is located, the second communication terminal being located a distance from the first communication terminal that exceeds a threshold, and the second communication terminal being located outside a coverage area of a local wireless communication network to which the first communication terminal belongs;

intercept said call associated with a call identifier of the first communication terminal;

retrieve, according to the call identifier of the first communication terminal associated with said call, a piece of routing information of said call, the routing information of said call having been received with the modification command; and route said call according to the routing information to the second communication terminal or a third terminal.

18. The routing equipment according to claim 17, wherein the at least one activation condition includes the distance between the second communication terminal and the first communication terminal exceeding the threshold.

19. A non-transitory computer-readable medium comprising program code instructions stored thereon which, when executed by a processor of a second communication terminal, configure the second terminal to:

manage routing of calls intended to be routed by to a first communication terminal by a gateway, without intervention of the first communication terminal by:

obtaining, by the second communication terminal, at least one piece of contextual information relating to said second communication terminal;

determining, by the second communication terminal that at least one activation condition is verified by the at least one piece of contextual information, wherein said at least one activation condition is selected from the group consisting of the second communication terminal leaving a geographic zone in which the first terminal is located, the second communication terminal being located a distance from the first communication terminal that exceeds a threshold, and the second communication terminal being located outside a coverage area of a local wireless communication network to which the first communication terminal belongs; and in response to the at least one activation condition being verified by said at least one piece of contextual information, transmitting, by the second communication terminal to the gateway, a modification command of the routing of calls intended for said first communication terminal, said modification command triggering a redirection, by the gateway, of said calls intended for said first communication terminal to said second communication terminal or to a third communication terminal.

20. A non-transitory computer-readable medium comprising program code instructions stored thereon for routing calls intended for a first communication terminal, when the program code instructions are executed by a processor of a gateway, the program code instructions configuring the gateway to:

receive, from a second communication terminal, a modification command of the routing of calls intended for said first communication terminal, without intervention of the first communication terminal, the second communication terminal being able to receive calls, and the modification command being based on at least one activation condition being verified by at least one piece of contextual information of the second communication terminal, wherein said at least one activation condition is selected from the group consisting of the second communication terminal leaving a geographic zone in which the first terminal is located, the second communication terminal being located a distance from the first communication terminal that exceeds a threshold, and the second communication terminal being located outside a coverage area of a local wireless communication network to which the first communication terminal belongs;

receive a call to be routed intended for the first communication terminal; and route said call to the second communication terminal or a third terminal, based on a piece of call routing information contained in the modification command.

* * * * *